(12) United States Patent
Aminoff et al.

(10) Patent No.: US 10,810,566 B2
(45) Date of Patent: Oct. 20, 2020

(54) SYSTEM FOR CONTROLLING A SERVICE STATION RELATED TO A VEHICLE

(71) Applicant: SUPEROPERATOR OY, Helsinki (FI)

(72) Inventors: Erkki Aminoff, Helsinki (FI); Anssi Kuutti, Tampere (FI); Mikko Pitkänen, Sillinjarvi (FI); Elisa Saarinen, Tampere (FI); Ari Ålander, Saynatsalo (FI)

(73) Assignee: SUPEROPERATOR OY, Helsinki (FI)

( * ) Notice: Subject to any disclaimer, the term of this patent is extended or adjusted under 35 U.S.C. 154(b) by 0 days.

(21) Appl. No.: 15/546,100

(22) PCT Filed: Nov. 25, 2015

(86) PCT No.: PCT/FI2015/050818
§ 371 (c)(1),
(2) Date: Jul. 25, 2017

(87) PCT Pub. No.: WO2016/120517
PCT Pub. Date: Aug. 4, 2016

(65) Prior Publication Data
US 2018/0018649 A1 Jan. 18, 2018

(30) Foreign Application Priority Data
Jan. 26, 2015 (FI) .................................... 20155052

(51) Int. Cl.
*G06Q 20/18* (2012.01)
*G06Q 20/32* (2012.01)
(Continued)

(52) U.S. Cl.
CPC ......... *G06Q 20/18* (2013.01); *G06Q 20/3224* (2013.01); *G07C 9/00071* (2013.01); *G07C 9/00087* (2013.01); *G07F 17/20* (2013.01)

(58) Field of Classification Search
CPC ............... G06Q 20/18; G06Q 20/3224; G07C 9/00071; G07F 17/20; Y04S 30/14; Y04S 40/126
(Continued)

(56) References Cited

U.S. PATENT DOCUMENTS 4,045,715 A * 8/1977 Umpleby ............. H02H 7/0851
318/16
9,288,270 B1 * 3/2016 Penilla .................. H04L 67/306
(Continued)

FOREIGN PATENT DOCUMENTS

DE   202013005162 U1   11/2013
DE   102013217854 A1   11/2014
(Continued)

OTHER PUBLICATIONS

International Search Report, Application No. PCT/FI2015/050818, dated Feb. 8, 2016, 4 pages.
(Continued)

*Primary Examiner* — Yong Hang Jiang
(74) *Attorney, Agent, or Firm* — Ziegler IP Law Group, LLC

(57) ABSTRACT

A system for controlling a service station related to a vehicle includes a user interface element (10) with an app installed in a user apparatus (20), an identification element (30), a control element (40) connected to the service station; and a back-end element (50). The identification element (30) is configured to retrieve identifying information and to send it to the back-end element (50), the back-end element (50) is configured to enable via the control element (40) the use of the service station based on the identifying information, and the user interface element (10) after receiving an authenti-
(Continued)

cation of an access right from the back-end element (50) is configured to enable the user to start a service of the service station.

21 Claims, 2 Drawing Sheets

(51) Int. Cl.
G07C 9/00 (2020.01)
G07F 17/20 (2006.01)
(58) Field of Classification Search
USPC .................. 340/5.1, 5.4, 5.41, 5.42, 5.8
See application file for complete search history.

(56) References Cited

U.S. PATENT DOCUMENTS

| | | | | |
|---|---|---|---|---|
| 10,489,746 B2* | 11/2019 | Shubat | ............... | G06Q 20/3224 |
| 2001/0027422 A1 | 10/2001 | Brandrud | | |
| 2002/0167919 A1* | 11/2002 | Marples | ................ | H04W 64/00 |
| | | | | 370/328 |
| 2009/0057401 A1* | 3/2009 | Brott | ......................... | B60S 3/00 |
| | | | | 235/382 |
| 2009/0240428 A1 | 9/2009 | Shahrestani | | |
| 2010/0082444 A1 | 4/2010 | Lin et al. | | |
| 2011/0320256 A1* | 12/2011 | Florucci | ............. | G06Q 30/0226 |
| | | | | 705/14.33 |
| 2012/0143657 A1 | 6/2012 | Silberberg | | |
| 2012/0209657 A1* | 8/2012 | Connolly | ........... | G06Q 20/3224 |
| | | | | 705/7.29 |
| 2012/0253973 A1 | 10/2012 | Harter | | |
| 2012/0274485 A1 | 11/2012 | Chen et al. | | |
| 2014/0085110 A1* | 3/2014 | Scofield | ................. | G07B 15/04 |
| | | | | 340/932.2 |
| 2014/0266047 A1 | 9/2014 | Robers et al. | | |
| 2014/0379530 A1 | 12/2014 | Kim et al. | | |
| 2015/0262086 A1* | 9/2015 | Mader | .................... | G06Q 10/02 |
| | | | | 705/5 |
| 2016/0221818 A1* | 8/2016 | Gotz | ....................... | B67D 7/04 |

FOREIGN PATENT DOCUMENTS

| | | |
|---|---|---|
| JP | 2002042235 A | 2/2002 |
| WO | 2011071548 A1 | 6/2011 |
| WO | 2013132449 A1 | 9/2013 |
| WO | 2014108467 A1 | 7/2014 |

OTHER PUBLICATIONS

Finnish Patent and Registration Office, Office Action, Application No. 20155052, dated Jul. 18, 2015, 7 pages.
Finnish Patent and Registration Office, Opposition, Application No. 20155052, dated Jun. 27, 2016, 1 page.
Written Opinion of the International Searching Authority, Application No. PCT/FI2015/050818, dated Feb. 8, 2016, 8 pages.
Extended European Search Report, Application No. 19214653.8, dated Feb. 17, 2020, 10 pages.

* cited by examiner

SYSTEM FOR CONTROLLING A SERVICE STATION RELATED TO A VEHICLE

TECHNICAL FIELD

The present application generally relates to a system for controlling a service station related to a vehicle. In particular, but not exclusively, the present application relates to a system for controlling a car wash station.

BACKGROUND

This section illustrates useful background information without admission of any technique described herein representative of the state of the art.

Car wash stations are largely automated and operate as self-service stations. Often the operator of the vehicle purchases an entry token, such as a code, from an operator of the station. Systems for purchasing the entry token using for example a mobile phone e.g. by dialing a number and subsequently receiving an entry code per SMS (Short Messaging Service) are also known.

In existing systems, the operator of the vehicle, i.e. the driver, needs to physically interact with the car wash station and accordingly step out of the vehicle or at least open a window thereof in order to input the entry token into the system. Commonly a user interface, such as keypad and a display, is provided next to the entrance of the car wash station for inputting and/or purchasing the entry token and starting the desired service.

Finnish utility model FI10184 discloses a system in which the need to purchase an entry token is replaced with a monthly subscription to the service and the access right is checked by recognizing the license plate of the vehicle. However, the system requires that the license plate of the vehicle is stored at a subscription database and the operator of the vehicle still needs to start the service by physically interacting with the car wash station.

Furthermore, the use of mobile communication devices for requesting entry into a parking installation is known from U.S. patent application US20120274482. In this system, near field communication is used to communicate with the entry and exit apparatus of a parking lot thus requiring a complicated arrangement of the system.

It is the aim of the current invention to provide a control system that mitigates the problems of the state of the art.

SUMMARY

Various aspects of examples of the invention are set out in the claims.

According to a first example aspect of the present invention, there is provided a system for controlling a service station related to a vehicle, comprising
 a user interface element comprising an app installed in a user apparatus;
 an identification element;
 a control element connected to the service station; and
 a back-end element; wherein
 the identification element is configured to retrieve identifying information and to send it to the back-end element;
 the back-end element is configured to enable via the control element the use of the service station based on the identifying information; and wherein
 the user interface element after receiving an authentication of an access right from the back-end element is configured to enable the user to start a service of the service station.

The identification element may comprise an imaging system for imaging an element related to the vehicle or the user.

The element related to the vehicle may comprise a license plate of the vehicle.

The identifying information may comprise a license plate number, an app specific code, biometric information of the user or a user apparatus specific code.

The identification element may be integrated in the back-end element or the user interface element.

The back-end element may comprise a cloud based service.

The control element may comprise a relay switch or a digital interface.

The user interface element, the identification element and the control element may be configured to communicate with the back-end element via the Internet.

The service station may comprise a car wash station.

According to a second example aspect of the present invention, there is provided a method for controlling a service station related to a vehicle, comprising
 initiating a user interface element comprising an app installed in a user apparatus;
 retrieving identifying information with an identification element;
 authenticating an access right on the basis of the identifying information with a back-end element;
 enabling the use of the service station via a control element;
 enabling the user to start a service of the service station via the user interface element after receiving an authentication of an access right from the back-end element.

The identifying information may comprise imaging an element related to the vehicle or the user.

The element related to the vehicle may comprise a license plate of the vehicle.

The identifying information may comprise a license plate number, an app specific code, biometric information of the user or a user apparatus specific code.

The method may further comprise checking the position of the vehicle and/or user apparatus after initiating the user interface element.

The method may further comprise providing via the user interface element control options for purchasing an access right.

The method may further comprise providing via the user interface element control options related to the service and/or notifications related to the service.

Authenticating an access right may comprise comparing the identifying information to a database of valid access rights.

The method may further comprise starting a service of the service station based on user input received via the user interface element and providing information to the user during the service via the user interface element (10).

The service station may comprise a car wash station.

According to a third example aspect of the present invention, there is provided a computer program comprising computer-executable program code that, when executed, causes the computer to execute a method according to the second example aspect.

According to a fourth example aspect of the present invention, there is provided a non-transitory memory medium comprising the computer program of the third example aspect.

Any memory medium hereinbefore or hereinafter may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device. In the context of this document, a "memory medium" may be any non-transitory media or means that can contain, store, communicate, propagate or transport the instructions for use by or in connection with an instruction execution system, apparatus, or device, such as a computer.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which.

DETAILED DESCRIPTON OF THE DRAWINGS

Figure 1:
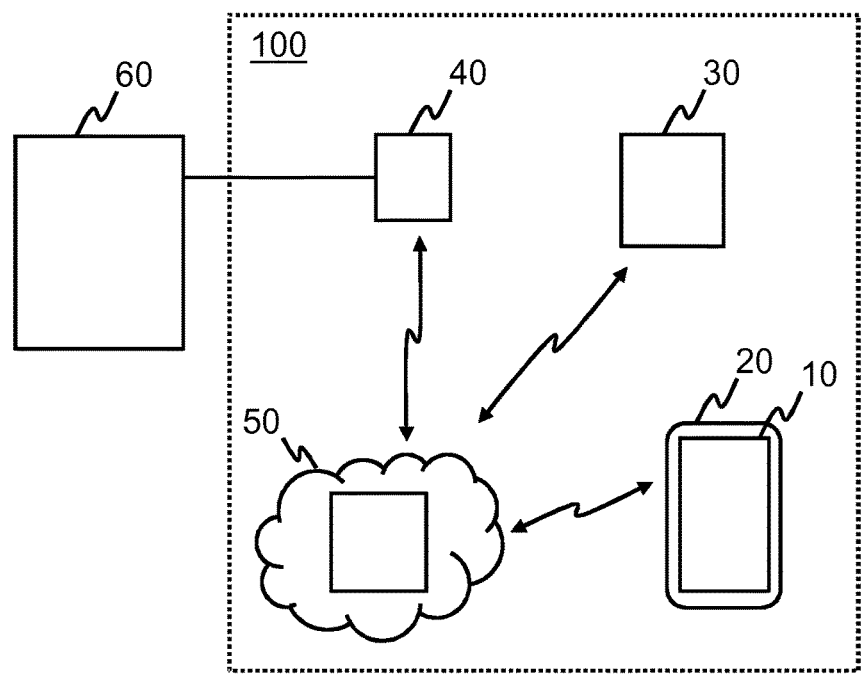
FIG. 1 shows a schematic principle view of a system according to an example embodiment of the invention.
Figure 2:
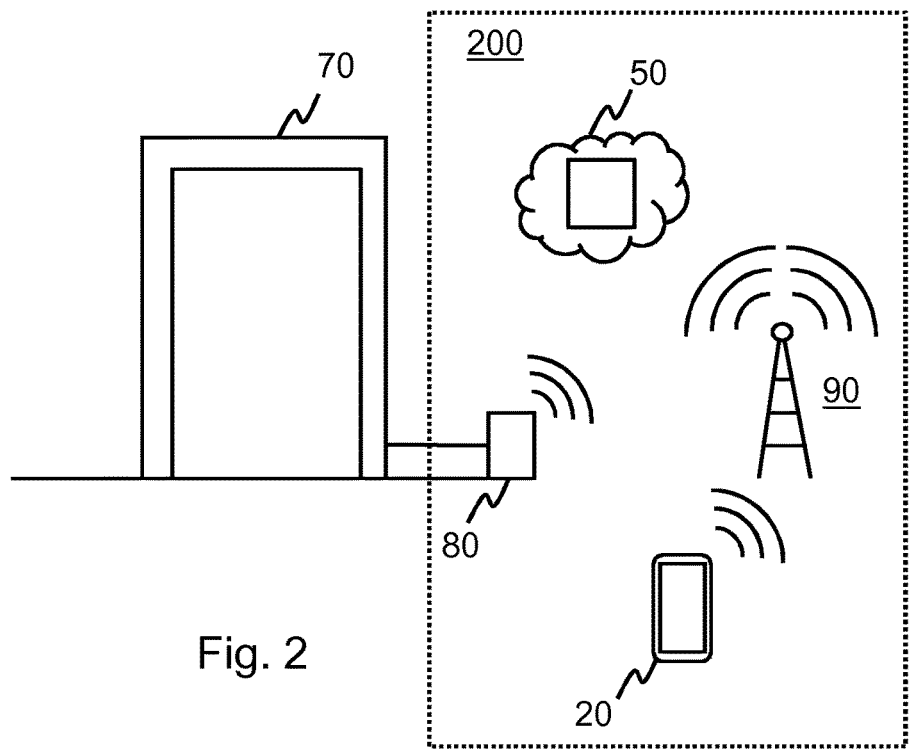
FIG. 2 shows a schematic principle view of an environment of a system according to an example embodiment of the invention.
Figure 3:
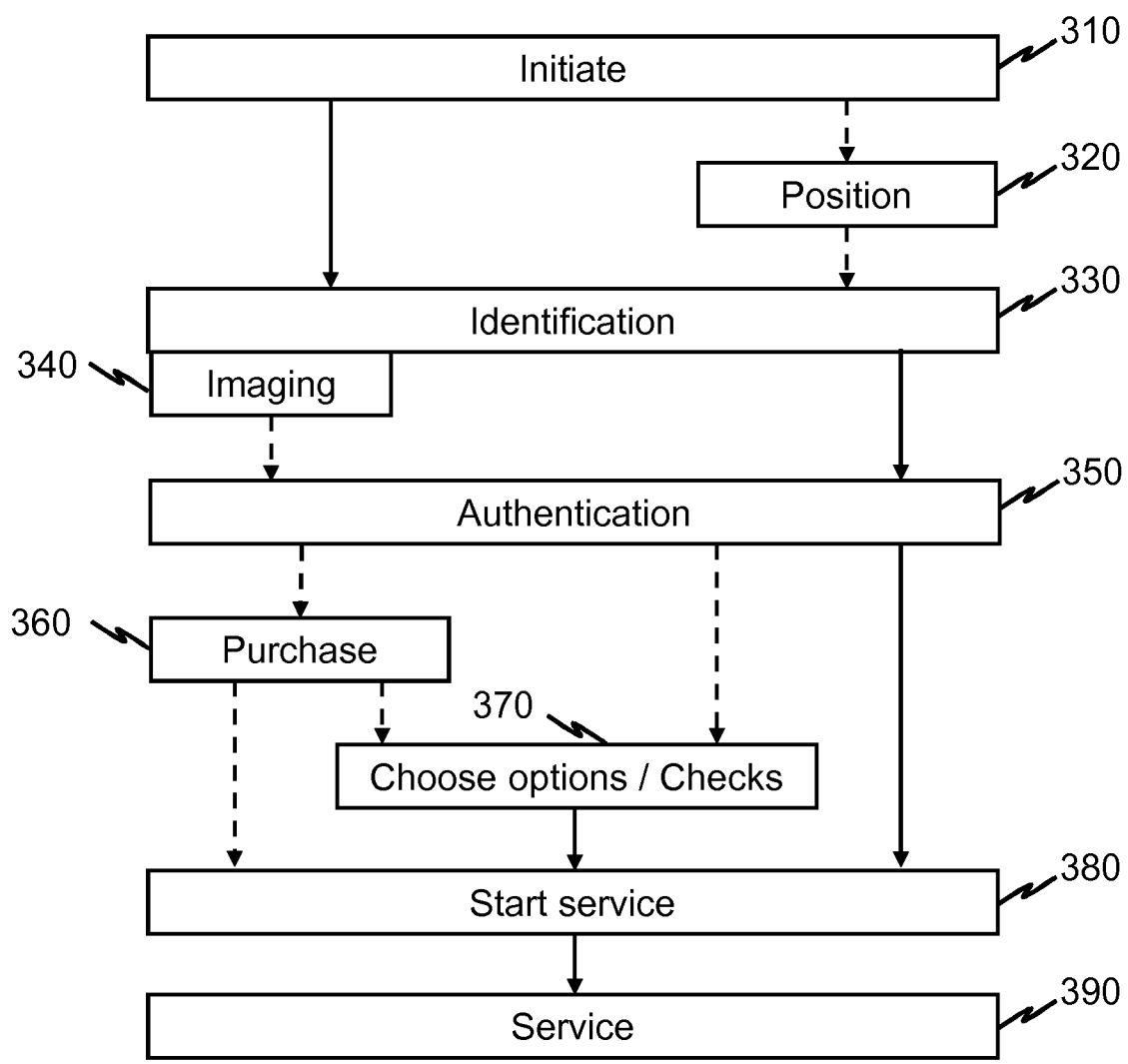
FIG. 3 shows a flow chart of a method of according to an example embodiment of the invention.

An example embodiment of the present invention and its potential advantages are understood by referring to FIGS. 1 through 3 of the drawings. In this document, like reference signs denote like parts or steps.

FIG. 1 shows a schematic principle view of a system according to an example embodiment of the invention. FIG. 1 shows a system 100 for controlling services related to a vehicle. In an example embodiment the service related to a vehicle comprises a car wash. The system 100 comprises a user interface element 10, an identification element 30, a control element 40 and a back-end element 50. FIG. 1 further shows the service station 60 relating to a vehicle to be controlled with the system 100. In an example embodiment, the service station comprises a car wash station. In a further example embodiment, the service station 60 comprises a parking station.

The user interface element 10 comprises, in an example embodiment, an application, or app, executed by a processor in an apparatus, i.e. a user apparatus 20. The user apparatus 20 comprises in an example embodiment a portable electronic device such as a smartphone, a mobile phone, a smartwatch, a PDA, a tablet computer or a laptop computer. In a further example embodiment, the user interface element 10 is an application executed by an element of the vehicle, such as the control and entertainment system of the vehicle. The user apparatus 20 comprises common elements and functionalities known to a skilled person, such as a communication interface, a processor, a memory, an input/output (I/O) unit a user interface (U/I) unit, such as a touch sensitive display. As the user interface element 10 is provided with an app installed in the user apparatus 20, the service station 60 requires no user interface or similar apparatus at all, accordingly, for example a car wash station does not require the traditional operating post next to the vehicle entrance, not even for starting the service as the user interface element is configured to carry this out.

The apparatus 20 is, and hence the applications executed by the processor thereof are, configured to communicate over one or more local links and/or to implement telecommunication links suited for establishing links with other users or for data transfer, e.g. using the Internet. For connecting to the internet, the apparatus is configured to establish a connection for example using a cellular or mobile operator network, such as a 3G, GPRS, EDGE, CDMA, WCDMA or LTE network. For such a connection, a mobile internet access is set up with the mobile operator. Further telecommunication links may be links using any of: wireless local area network links, Bluetooth, ultra-wideband, cellular or satellite communication links.

The identification element 30 comprises, in an example embodiment, an imaging system configured to image a license plate of the vehicle. This is, in an example embodiment, done in order to ascertain that the service station is being used for a certain vehicle. In a further example embodiment, the imaging means is in addition or instead configured to image a further part or portion of the vehicle and/or to image the driver of the vehicle. The imaging system comprises a conventional imaging system, such as video camera, digital video camera, digital still camera, thermal imaging camera, a 3D-camera or a laser camera. In an example embodiment, the imaging system comprises further elements needed for recognizing objects in the imaged image, such as a processor and memory configured to cause recognizing and processing information from the image, for example for retrieving the license plate number of the vehicle. The identification element further comprises communication means, for example similar to those described in connection with the apparatus 20, for communicating with the other elements of the system, in an example embodiment with the back-end element 50. In a further example embodiment, the identification element comprises instead of or in addition to the imaging system, further means for recognizing the vehicle and/or the driver of the vehicle, such as RFID (Radio Frequency Identification) or NFC (Near Field Communication) identification system or a machine readable code such as a bar code or a QR code.

In a still further example embodiment, the identification element is incorporated into or integrated with the back-end element 50 and/or the apparatus 20. In an example embodiment, the apparatus 20 comprises imaging means used to image and identify an element installed in the, or otherwise related to, the vehicle and/or the driver of the vehicle. In a further example embodiment, the back-end 50 is configured to identify the apparatus 20, for example a unique identifier of the apparatus 20 sent to the back-end by the user interface element 10.

The control element 40 comprises, in an example embodiment a relay switch configured to enable the service related to a vehicle to start. In a further example embodiment, the control element 40 comprises a digital interface using a digital I/O-module or a bus such as a Controller Area Network (CAN) bus or an I²C bus. The control element is, in an example embodiment, installed to the control system of a service 60 such as a car wash station. In an example embodiment, the control element 40 comprises communication means, for example similar to those described in connection with the apparatus 20, for communicating with the other elements of the system, in an example embodiment with the back-end element 50. The control element 40 is the only element that is physically connected to the service relating to a vehicle, such as to a car wash station, and accordingly, the system 100 is very easy and cost effective to install to any service station, as a skilled person appreciates that wireless relay switches are commonly available and inexpensive.

The back-end element 50 comprises, in an example embodiment, a cloud based service configured to administrate and control the system 100 as hereinafter described with reference to FIG. 3. The back-end 50 comprises the means and functionalities configured to maintain a database of vehicles, user interface elements 10 and/or users having access rights to the service station 60, process information received from the user interface element 10 and the identification element 30 and to communicate with the elements of the system using communication means as hereinbefore described. In an example embodiment the back-end is a cloud based service accessible via the Internet. In a further example embodiment, the back-end element comprises a server located at the service station 60 and accessible via internet. It is an advantage of the system 100 that the functionalities of the back-end need not be integrated or installed at the service station 60, which would require significant cost and effort, but rather the system 100 comprises the back-end 50 accessible via local or telecommunications. A skilled person appreciates that the back-end 50 is, in an example embodiment shared with, i.e. configured to administrate and control, a plurality of systems 100 and hence a plurality of service stations 60.

The back-end element 50 is configured to check the access right to the service 60. In an example embodiment, the back-end 50 comprises means for receiving identifying information from the identification element 30, from an identification element integrated with the user apparatus 20, or receive information from the identification element 30 or the user interface element 10 from which information the identifying information can be retrieved by further processing.

In an example embodiment, there are several categories of access rights. In an example embodiment, the access right is vehicle specific, in which case the identifying information comprises for example the license plate number or a further code specific to the vehicle and the code is retrieved by imaging with an imaging system comprised in the identification element 30. In an example embodiment, the register plate is imagined with a digital video camera, digital still camera or a further imaging device, or a code specific to the vehicle is imagined using an imaging system of the user apparatus 20.

In a further example embodiment, the access right is user interface element 10 specific, i.e. specific to the app installed in the user apparatus 20. In such a case the identifying information comprises for example a code specific to the app or to the user apparatus. In a further example embodiment, the position of the user apparatus 20 is controlled before an app specific access right is acknowledged. In a case in which the app is executed by a user apparatus that is integrated with the vehicle, a vehicle specific access right is also enabled with only the app specific code.

In a still further example embodiment, the access right is user specific. In such a case the identifying information comprises for example biometric information of the user. The biometric information may be retrieved by imaging with the identification element 30, using the imaging means of the user apparatus 20, or by further biometric identification such as a fingerprint reader.

In an example embodiment all categories of access rights, i.e. vehicle specific, app specific and user specific access rights can be retrieved by subscribing to a monthly access program. Furthermore, access right for a certain predetermined amount of using the service 60, for example during a certain time period, may be subscribed. In further example embodiment, there are limitations to access rights, for example only a certain amount of use is allowed during a predetermined time period.

If no access right is found in the database, the back-end element 50 is configured to provide, via the user interface element, a possibility to purchase a one-time access right, thus allowing a random user of the service 60 to enjoy a similar convenient user experience. Such single access right is in an embodiment, conveniently paid in the app with common means such as a credit card.

FIG. 2 shows a schematic principle view of an environment of a system according to an example embodiment of the invention. The user of the system 200, i.e. the driver of a vehicle to be washed, has with her a smartphone 20, in which has been installed the user interface element of the system, i.e. a car wash application. As the user is prepared to use the car wash station 70, she initiates, i.e. executes, the app in the smartphone. The car wash is connected to a module 80, comprising an identification element and a control element, such as a digital video camera and a relay switch. The identification element identifies a unique identifier of the vehicle and sends the information to the back-end 50 through a mobile telecommunications network 90. The back-end is configured to check the access right of the vehicle and or user and after access right has been acknowledged, this is communicated to the smartphone 20 and the user is able to start the car wash from the car wash app. During the whole process, the user need not step out of the vehicle, nor open a window. If the user has no access right to the car wash, she may buy access using the user interface element, i.e. the app as hereinafter described, again without stepping out of the vehicle or opening a window.

FIG. 3 shows a flow chart of a method of according to an example embodiment of the invention. It is to be noted that the steps of the method carried out by the user interface element 10 in the user apparatus 20, the identification element 30 or the back-end 50 are configured to be caused to be carried by a processor of the respective element.

At step 310 the system is initiated. In an example embodiment, the user of the system, typically the driver of the vehicle for which the service related to a vehicle, i.e. the service station 60,70 is to be used, launches the user interface element 10, i.e. the application, in her personal device, such as a smartphone. The app 10 is in an example embodiment launched at the service station 60,70 or launched at a different location.

At step 320, depending on the options chosen for the user interface element 10, the app retrieves location information using the positioning services of the user apparatus 20 in which the app 10 is installed. If the user, and hence the vehicle is at the service station, the method proceeds to subsequent steps. In an example embodiment, if the user is at another location, the app provides suggestions of service stations nearby and directions how to reach them with a navigation system of the user apparatus 20. In a further example embodiment, the user interface element provides data on the status of the nearby service stations, for example if a certain service station is out of service or has a very long queue.

At step 330, identification is carried out. In an example embodiment, the identification element images at 340 the register plate of the vehicle and retrieves the license plate number that is then sent as identifying information to the back-end element 50 for verification or authentication of access right to the service station 60,70 to be used. In a further example embodiment, the image of the register plate per se is sent to the back-end element 50 configured to retrieve the identifying information therefrom. In a still further example embodiment, the imaging means of the user apparatus 20 are used at 340 to image an element, such as a specific code element for example, inside the car and the identifying information is retrieved from such image in the user apparatus 20 or the back-end element 50, i.e. the identification element 30 is integrated with either. In a still further example embodiment, biometric information relating to the user is used. In such a case e.g. the face of the user or a fingerprint is imaged with the imaging means of the user apparatus 20 and the identifying information is retrieved therefrom in the user apparatus 20 or the back-end element 50, i.e. the identification element 30 is integrated with either.

In a still further example embodiment, the user interface element 10, or the user apparatus 20, comprises identifying information such as a device specific code that is sent to the back-end element 50, and accordingly, the identifying element 30 need not comprise imaging means.

In a still further example embodiment, steps 340 and/or 330 are automatically carried out as the vehicle arrives at the service station 60,70. In such a case the identifying information is sent to the back-end element automatically, as the vehicle or the user is in the proximity of the service station 60,70 and the back end is configured to communicate with the user apparatus in order to automatically launch the user interface element 10, i.e. the app, based on the identification. The arrival of the vehicle is in an example embodiment detected by the positioning system of the user apparatus 20, or by the imaging means of the identifying element detecting for example a register plate of the vehicle. In a still further example embodiment, the arrival of the vehicle is detected by further means, for example by detecting an rfid placed in the vehicle. In an example embodiment, if for example vehicle based access right is subscribed, and the vehicle has several users and accordingly several user apparatuses are used, the back-end element is configured to detect and to communicate with the user apparatus nearest to the service station and to automatically launch the app 10 in the correct apparatus.

At step 350, the identifying information sent to the back-end element at 330,340 is used for authentication, i.e. the access right of the vehicle, user or user interface element to the service station 60,70 is checked. In an example embodiment, the back-end comprises a database of valid subscriptions providing access rights and compares the identifying information received with the entries of the database. If the identifying information matches a valid subscription, the use of the service station 60,70 is enabled via the control element 40 by sending a corresponding command to the control element 40, i.e. to the relay switch. In case of a subscription of a predetermined amount of use, the back-end element 50 is further configured to verify that the usage limit, i.e. the amount used or the amount used during a certain period has not been exceeded.

If the back-end determines that no valid subscription exists for the identifying information received, a possibility to purchase an access right is provided via the user interface element 10 at step 360. In an example embodiment, the user is provided with control options to choose from, for example an option to purchase a one-time access right or to subscribe to the service, for example on monthly basis. The user interface element 10 in communication with the back-end element 50 carries out based on user input the necessary steps of choosing the desired access right and paying for it, for example with a credit card, and subsequently the use of the service station 60,70 is enabled via the control element 40 by sending a corresponding command to the control element 40, i.e. to the relay switch.

At step 370, the user interface element is configured to present the user with options related to the service to be used. The options presented depend, in an example embodiment, on the type of access right. In an example embodiment, the user may choose additional options, such as extra service steps, for example an extra rinse or wash in case of a car wash. In an example embodiment, the user interface element 10 provides guidance to the user for performing checks related to the vehicle, for example guidance on checking the windows, the antenna and roof installed transport containers. In further example embodiment, the identifying element 30 is configured to perform checks related to the vehicle at this point using an imaging system. The imaging system images the vehicle and detects for example hazards relating to the service to be used, such as windows being open, antenna not being removed, or excessive height due to a roof installed transport containers and provides notifications via the user interface element 10. In a still further example embodiment, the imaging system together with the back-end element compares the image with a previous image of the vehicle and detects for example excessive dirtiness of the vehicle in order to present more effective wash options for the user via the user interface element 10. In an example embodiment, the user or the system may be configured not to carry out step 370 in which case step 380 is carried out directly after step 350 or 360.

At step 380, the user interface element 10 is configured to enable the user to start the service after having received from the back-end element the authentication of the access right. The user interface element 10 provides the user with the means for starting the service, i.e. the service is directly started from the user apparatus 20 in communication with the back-end element 50 and the control element 40 without the user having to physically operate the service station, e.g. by opening a window and pressing a start button. The user starts the service with user input, e.g. by pressing a button presented on the touch screen of the user apparatus 20. Should the service station be reserved at the time the user wishes to start the service, the user interface element, in an example embodiment, informs the user on the estimated waiting time and enables the starting of the service only when it is the turn of the user. Accordingly, an accidental starting of the service at a wrong time or for a wrong vehicle is avoided.

At step 390 the service is, for example the car was, is carried out. During the service, in an example embodiment, the user interface element, i.e. the app, provides user with information on the progress of the service. Such information comprises for example an estimate of the time remaining or information on possible problems related to the service. During the service, the system knows that the user apparatus 20 is located at the service station. In an example embodiment, the user interface element 10 is configured to present the user with information, such as commercial information, depending on the interests and previous behavior of the user. In a still further example embodiment, the access right comprises additional services such as a use of free internet access or access to media services during the service. In a still further example embodiment, after the service has been completed, it is noted in the database of the back-end element 50, and the user interface element is configured to provide reminders of service need for the user after for example a predetermined amount of time has passed.

Without in any way limiting the scope, interpretation, or application of the claims appearing below, a technical effect of one or more of the example embodiments disclosed herein is a cost effective and easy to install control of a service station. Another technical effect of one or more of the example embodiments disclosed herein is a convenient user experience. Another technical effect of one or more of the example embodiments disclosed herein is the provision of a system enabling different types of identifications. A still further technical effect of one or more of the example embodiments disclosed herein is an improved monitoring and control of service usage.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, with examples of a suited apparatus being described and depicted hereinbefore. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

The invention claimed is:

1. A system for controlling a service station configured for providing a service to a vehicle, the system comprising:
    a user interface element, the user interface element comprising an application installed in a user apparatus;
    an identification element configured to retrieve identifying information related to the vehicle;
    a control element connected to the service station, the control element configured to enable a use of the service station; and
    a back-end element configured to receive the identifying information from the identification element; wherein
    the back-end element comprises a database identifying access rights, the back-end element being configured to compare the identifying information with access rights identified in the database; and
    wherein subsequently the back-end element is configured to enable via the control element the use of the service station based on the identifying information if the comparison results in a match of the identifying information with an access right; or if no match is found, the back-end element is configured to enable a purchase of a one-time access right via the user interface element and after the purchase is validated, enable, via the control element, the use of the service station; and wherein
    the user interface element is configured to present the user with options related to services of the service station; and
    the user interface element, after receiving an authentication of the access right from the back-end element, is configured to enable the user to start a service of the service station directly from the user apparatus based on a user input received via the user interface element.

2. The system of claim 1, wherein the identification element comprises an imaging system for imaging an element related to the vehicle or the user.

3. The system of claim 2, wherein the element related to the vehicle comprises a license plate of the vehicle.

4. The system of claim 1, wherein the identifying information comprises a license plate number, an app specific code, biometric information of the user or a user apparatus specific code.

5. The system of claim 1, wherein the identification element is integrated in the back-end element or the user interface element.

6. The system of claim 1, wherein the back-end element comprises a cloud based service.

7. The system of claim 1, wherein the control element comprises a relay switch or a digital interface.

8. The system of claim 1, wherein the user interface element, the identification element and the control element are configured to communicate with the back-end element via the Internet.

9. The system of claim 1, wherein the service station comprises a car wash station.

10. A method for controlling a service station configured to provide a service related to a vehicle, the method comprising:
    initiating a user interface element comprising an application installed in a user apparatus;
    retrieving identifying information with an identification element;
    authenticating an access right on the basis of the identifying information with a back-end element, wherein the back-end element comprises a database identifying access rights, and the method further includes the back-end element comparing the identifying information to access rights identified in the database; and
    subsequently, enabling the use of the service station via a control element if the comparison results in a match of the identifying information with an access right; or if no match is found, enabling a purchase of a one-time access right via the user interface element and after the purchase is validated, enable, via the control element, the use of the service station;

presenting the user via the user interface element options related to services of the service station; and enabling the user to start a service of the service station via the user interface element after receiving an authentication of an access right from the back-end element; and starting a service of the service station directly from the user apparatus based on a user input received via the user interface element.

11. The method of claim 10, wherein retrieving the identifying information comprises imaging an element related to the vehicle or the user.

12. The method of claim 11, wherein the element related to the vehicle comprises a license plate of the vehicle.

13. The method of claim 10, wherein the identifying information comprises a license plate number, an app specific code, biometric information of the user or a user apparatus specific code.

14. The method of claim 10, further comprising checking the position of the vehicle and/or user apparatus after initiating the user interface element.

15. The method of claim 10, further comprising providing via the user interface element control options for purchasing an access right.

16. The method of claim 10, further comprising providing via the user interface element control options related to the service and/or notifications related to the service.

17. The method of claim 10, wherein authenticating an access right comprises comparing the identifying information to a database of valid access rights.

18. The method of claim 10, further comprising starting a service of the service station based on user input received via the user interface element and providing information to the user during the service via the user interface element.

19. The method of claim 10, wherein the service station comprises a car wash station.

20. A computer program product comprising non-transitory computer-executable program code that, when executed, causes a computer to execute a method according to claim 10.

21. A non-transitory memory medium comprising the computer program of claim 20.

* * * * *

UNITED STATES PATENT AND TRADEMARK OFFICE
CERTIFICATE OF CORRECTION

PATENT NO. : 10,810,566 B2
APPLICATION NO. : 15/546100
DATED : October 20, 2020
INVENTOR(S) : Erkki Aminoff et al.

It is certified that error appears in the above-identified patent and that said Letters Patent is hereby corrected as shown below:

In Claim 1, Column 10, Line 27, insert the following after "element":
--and provide information to the user during the service via the user interface element, and the system being configured to check a position of the vehicle and/or the user apparatus after initiation of the user interface element--

In Claim 10, Column 10, Line 54, insert the following after "apparatus":
--and checking a position of the vehicle and/or the user apparatus after initiating the user interface element--

In Claim 10, Column 11, Line 4, delete "and" after "station;"

In Claim 10, Column 11, Line 8, delete "and"

In Claim 10, Column 11, Line 11, insert the following after "element":
--;and providing information to the user during the service via the user interface element--

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*